US012443590B2

(12) United States Patent
Manamohan et al.

(10) Patent No.: US 12,443,590 B2
(45) Date of Patent: Oct. 14, 2025

(54) DECENTRALIZED POLICY-BASED TRANSACTIONAL OBJECT MANAGEMENT FOR FEDERATED WORKFLOWS

(71) Applicant: HEWLETT PACKARD ENTERPRISE DEVELOPMENT LP, Spring, TX (US)

(72) Inventors: Sathyanarayanan Manamohan, Bangalore (IN); Krishnaprasad Lingadahalli Shastry, Bangalore (IN); Ravi Sarveswara, Bangalore (IN); Saikat Mukherjee, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 245 days.

(21) Appl. No.: 18/160,704

(22) Filed: Jan. 27, 2023

(65) Prior Publication Data

US 2024/0256525 A1 Aug. 1, 2024

(51) Int. Cl.
*G06F 16/20* (2019.01)
*G06F 16/23* (2019.01)
*G06F 16/27* (2019.01)
*G06F 21/62* (2013.01)

(52) U.S. Cl.
CPC ........ *G06F 16/2379* (2019.01); *G06F 16/273* (2019.01); *G06F 21/6218* (2013.01)

(58) Field of Classification Search
CPC ............... G06F 16/2379; G06F 16/273; G06F 21/6218; G06F 16/27
See application file for complete search history.

(56) References Cited

U.S. PATENT DOCUMENTS

| | | | |
|---|---|---|---|
| 10,824,740 B2 | 11/2020 | Wu et al. | |
| 11,037,227 B1 | 6/2021 | Padilha et al. | |
| 11,146,560 B1* | 10/2021 | Nene | G06F 16/2365 |
| 11,257,073 B2 | 2/2022 | Padmanabhan | |
| 2017/0353309 A1* | 12/2017 | Gray | G06F 21/51 |
| 2019/0018984 A1* | 1/2019 | Setty | H04L 9/3239 |
| 2020/0065427 A1* | 2/2020 | Tofighbakhsh | G06N 5/025 |
| 2023/0259640 A1* | 8/2023 | Metzler | G06F 21/6218 |
| | | | 713/191 |
| 2023/0297701 A1* | 9/2023 | Mouallem | G06F 21/62 |
| | | | 726/30 |

OTHER PUBLICATIONS

Drungilas et al., "Towards Blockchain-Based Federated Machine Learning: Smart Contract for Model Inference", Jan. 23, 2021, 21 pages.

(Continued)

*Primary Examiner* — Mahesh H Dwivedi
(74) *Attorney, Agent, or Firm* — Dickinson Wright

(57) ABSTRACT

Systems and methods are disclosed for providing decentralized policy-based transactional object management for systems employing federated workflows. Various disclosed components may be added to one or more nodes of a decentralized network, wherein the disclosed components perform registration, replication, and read/write access interfacing functions. These functions result in the storage of objects on the decentralized network in a way which allows for decentralized, policy-based, and transactional management of the objects.

11 Claims, 7 Drawing Sheets

(56) References Cited

OTHER PUBLICATIONS

Witt, et al., "Decentral and Incentivized Federated Learning Frameworks: A Systematic Literature Review", May 18, 2022; 18 pages.
Hearn, M. et al., "Corda: A Distributed Ledger," Version 1.0, Aug. 20, 2019, 73 pages, https://docs.r3.com/en/pdf/corda-technical-whitepaper.pdf.
Williams, S. et al., "Arweave: A Protocol for Economically Sustainable Information Permanence," Nov. 2019, Arweave Yellow Paper, 67, https://www.arweave.org/yellow-paper.pdf.
Storj Labs, Inc., "Storj: A Decentralized Cloud Storage Network Framework," Mar. 7, 2024, v31, https://static.storj.io/storjv3.pdf.
Vorick, D. et al., "Sia: Simple Decentralized Storage," Nov. 29, 2014, https://sia.tech/whitepaper.pdf.
Benet, J., "IPFS—Content Addressed, Versioned, P2P File System (Draft 3)," arXiv preprint arXiv: 1407.3561, 2014, pp. 1-11, https://ipfs.io/ipfs/QmV9tSDx9UiPeWExXEeH6aoDvmihvx6jD5eLb4jbTaKGps.
Hyperledger Fabric, "Private Data," What's New in Hyperledger Fabric v2.x, Key Concepts, 2020, release 2.2, https://hyperledger-fabric.readthedocs.io/en/release-2.2/private-data/private-data.html.

* cited by examiner

DECENTRALIZED POLICY-BASED TRANSACTIONAL OBJECT MANAGEMENT FOR FEDERATED WORKFLOWS

BACKGROUND

In the context of decentralized systems, issues may arise when storing objects. Often a distributed ledger provides a backbone for the decentralization of the system. Where operation of the system involves storing objects to the distributed ledger, objects may begin to slow down the operation of the decentralized system as the size of the objects increases, particularly where the size of the object begins to approach or exceed the size of a transaction block on the distributed ledger.

As an object's size increases, agents processing transactions with the distributed ledger must engage in more and more computations to verify that the data added to the distributed ledger is legitimate and recognized according to each node on the decentralized system. As the computational demands increase for agents processing transactions with the distributed ledger, delays in the operation of the distributed ledger are introduced in order to wait for the processing agents. Thus, the slowdown of the distributed ledger results in issues with the responsiveness, decentralization, and security of the decentralized system as a whole.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
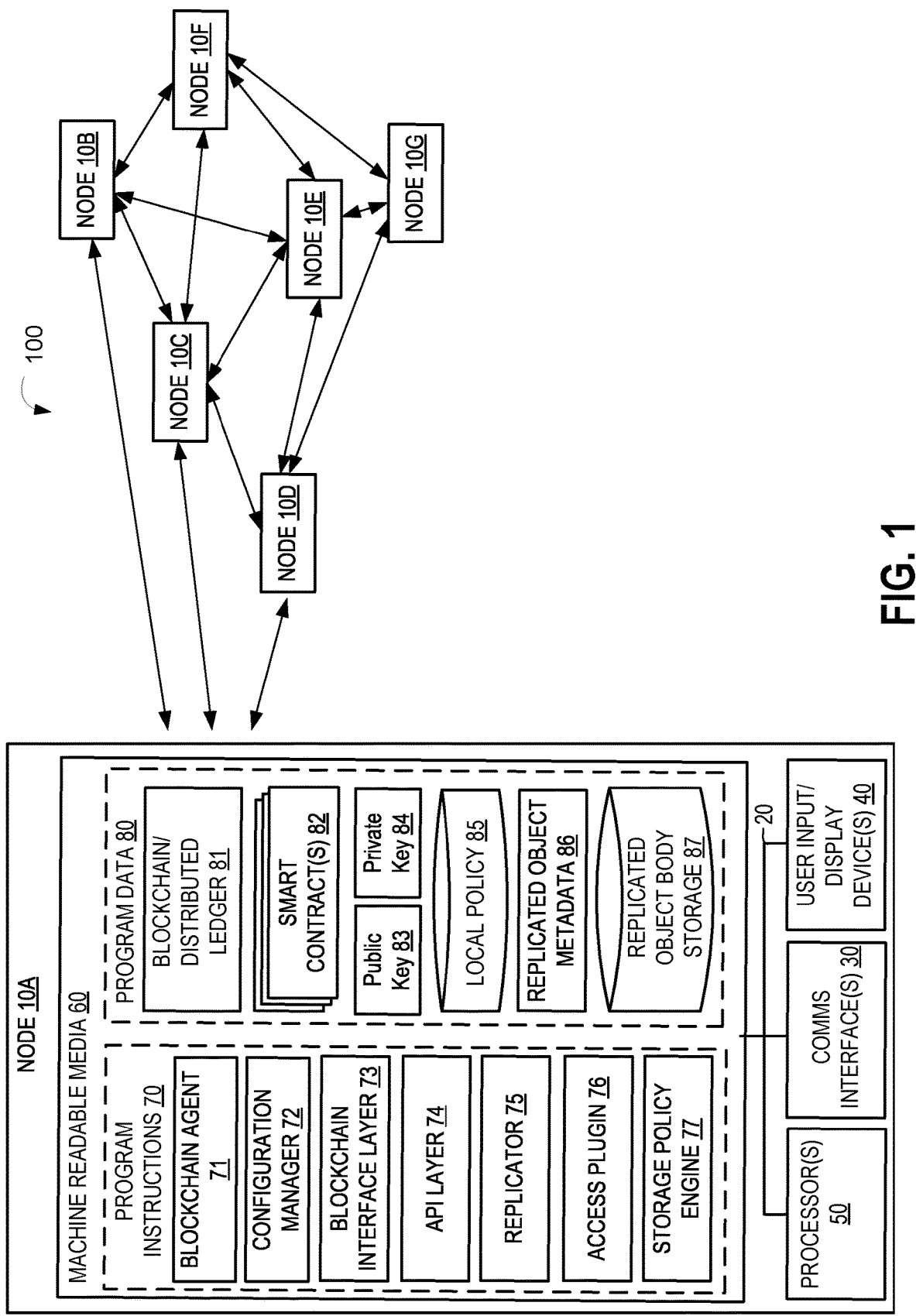
FIG. 1 illustrates an embodiment of a system supporting decentralized policy-based transactional object management in the context of federated machine learning ("ML") workflows, according to the present disclosure.

The figures are not exhaustive and do not limit the present disclosure to the precise form disclosed.

DETAILED DESCRIPTION

Systems employing federated ML workflows may, in some embodiments, rely on a distributed ledger to provide a backbone for the decentralized management of the associated ML workflows. An example of such a system relying on a distributed ledger backbone is described in U.S. patent application Ser. No. 17/868,587, filed on Jul. 19, 2022, the contents of which are incorporated by reference herein. Such federated ML workflows may use objects associated with workflow execution (e.g. ML workflow task definitions, resource profiles of partitions where ML workflow tasks are going to run, policy definitions, access control definitions). Some of such objects are too large to be handled efficiently in-ledger, that is, storage on the distributed ledger may result in a slowdown of the entire system. In order to prevent such slowdown, systems and methods are needed to allow for object storage outside of any distributed ledger forming the backbone of the decentralization of the system employing the federated workflows.

At the same time, the storage systems and methods used should not sacrifice the decentralization of the system employing the federated ML workflows. Decentralized object management effectuates a decentralized system, as a whole. Both the federated workflows and their objects are managed in a decentralized manner, where no node on the system acts as a central authority. In addition, federated workflows also benefit where objects can be managed in a policy-based, transactional manner, as this comports with the policies and transactions used to manage the federated ML workflows themselves.

As detailed below, systems and methods of the present disclosure allow for objects to be managed on a system employing federated workflows by way of transactions with a distributed ledger. Where metadata generated relating to an object (e.g., storage location, access privileges, file size) is changed, agents on the system work to take action to cause the storage characteristics of the associated objects to match policies within the changed metadata. In this way, objects are managed in a transactional and policy-based manner. Further, because the object metadata is available in the decentralized ledger, which is copied globally to every node of the system, objects can be managed from any node, even from nodes which do not contain a copy of the object itself (the "object body"). Such ability to manage objects from any node allows for decentralized object management. Decentralized object management in turn allows for the system as a whole to remain decentralized, as both the federated workflows and their objects are managed in a decentralized manner, wherein no node on the system acts as a central authority.

Only the object metadata is stored at every node by virtue of the storage of object metadata on the distributed ledger. Furthermore, object metadata is, in many embodiments, orders of magnitude smaller in size than the object body. Therefore, the embodiments disclosed herein allow for decentralized, policy-based, transactional object management with federated workflows, wherein the storage of the objects on the system employing federated workflows avoids slowing down the distributed ledger backbone with object body data. As described further below, object body data is instead stored at certain nodes on the system ("replicating nodes"), and is replicated to new replicating nodes by way of certain replicator components where policies in the object metadata command such replication of the object body across multiple nodes of the system.

Systems and methods for employing decentralized policy-based transactional object management in the context of federated ML workflows are the subject of the present disclosure. As discussed above, any decentralized system utilizing a distributed ledger may benefit from systems preventing the storage of object body data directly on the distributed ledger. While embodiments of the present disclosure are discussed in the context of a system also employing federated ML workflows, other embodiments may be employed which provide the disclosed systems and methods for decentralized policy-based transactional object management in the context of a system employing federated workflows for any goal.

The present disclosure illustrates implementation of decentralized policy-based transactional object management by way of several components present at one or more nodes on a system employing federated workflows. As described in relation to the figures below, an API layer, a replicator, a storage policy engine, and an access plugin present at one or more nodes facilitate the disclosed methods for providing decentralized policy-based transactional object management on the system. Other embodiments may have nodes wherein one or more of the disclosed components are not present, however the decentralized policy-based transactional object management features may still be provided in such embodiments, given the disclosed methods are still completed by other components at one or more nodes on the system.

As described in further detail below, the API layer allows for users and/or other nodes on the system to interact with the replicator present at a given node. Users and/or other nodes on the system may submit requests via the API layer to receive or modify object metadata and/or object body data and these requests are then picked up by the replicator component at the node. The replicator then processes these requests against policies present in the object metadata, wherein the definitions of the policies referenced in the object metadata may be stored at the node's storage policy engine. Where the policies permit servicing the request, the replicator sends the requested object body and/or metadata to the requestor via the API layer. In some embodiments, where the replicator is at a replicating node and the requestor requested the object body data, the replicator retrieves the object body by way of an access plugin, which interfaces with the nodes replicated object body storage.

Further, replicators at any node may translate a request to modify an object's storage characteristics into changes to the object's metadata and write this changed metadata to the distributed ledger. Replicators at each node on the network may continually monitor the distributed ledger for new or changed metadata, and in response to detecting new or changed metadata, replicators at each node may autonomously take steps to enforce any policies reflected in the new or changed metadata.

In some embodiments, copies of a given object body are sent to multiple nodes designated as replicating nodes in the object metadata, enhancing the redundancy of the object body on the network and also reducing delays in transferring the object body to new nodes where the object body may be requested in the future. In embodiments where every replicating node is equal in capability and there are no nodes designated as owning an object, there is no notion of a master copy, and by implication no central authority.

The presence of replicating nodes also helps prevent the overload of the distributed ledger because object body data can be pulled from the replicating nodes instead of the distributed ledger. Where a node fails, one or more replicating nodes on the system may be tapped for a copy of the object body. Where a change in storage policies regarding an object dictate an object body should be replicated to a node, one or more replicating nodes on the system may be tapped for a copy of the object body.

In some embodiments, replicators acting at each node may continually monitor object metadata present on the distributed ledger for instances where the storage state of the object reflected in the object metadata fails to match storage policies of the object reflected in the object metadata. Where the storage state of the object fails to match storage policies of the object, replicators at nodes where the object body is supposed to be replicated may autonomously submit requests for the object body to replicating nodes.

In some embodiments, the list of replicating nodes for an object is present is the object's metadata stored on the distributed ledger. In some embodiments, agents at replicating nodes regularly report their status as a replicating node for a given object to the object's metadata and write the updated metadata to the distributed ledger. In such embodiments, where one replicating node fails on the network, replicators at the replicating node will fail to report to the object metadata on the distributed ledger that they are a replicating node at the regular interval, and replicators at other nodes on the system may infer from the failed reporting that the replicating node has failed. Other non-replicating nodes on the system may autonomously react to the failed replicating node by requesting copies of the object body such that they may become new replicating nodes and preserve storage characteristics for the object set in the objects storage policies present in the object metadata.

In cases where policy definitions (e.g., access control lists) are large enough to require off-ledger storage, policy-based management may be achieved through storing the policy definitions themselves as replicated objects, with an object body stored locally at a replicating node. Policy-based object management is achieved in this situation by the described methods above for keeping a globally consistent record of the state of each object via the distributed ledger.

For instance, where a user makes a change to a list of permitted users in an access control list at a replicating node housing the list, the replicator component at the node may indicate in metadata associated with the access control list in the distributed ledger that the access control list has been changed. Other replicating nodes in the network may then request and/or receive copies of the updated list from the node housing the updated version of the list. Where the credentials in the access control list are referenced by a node executing policies later, the node may be referred to one of the replicating nodes with the updated list based on the access control list metadata available globally. The node may then request a copy of the updated access control list object body from a replicating node or request that a replicating node perform the credential check locally. In some embodiments where a workflow policy is stored as a replicated object, an indication of a change to the policy may be similarly propagated to the distributed ledger, and this indication may in turn trigger a restart of a policy engine at one or more network nodes in order to incorporate the policy changes.

In contrast with other storage solutions, utilization of the disclosed replicator components operating based on object metadata present globally on the distributed ledger allows the disclosed systems to store object body data in a way that preserves a globally consistent record of the state of each object, allows for decentralized management of each object not limited to the original users storing the object on the system, and allows changes to object body data to be confidently propagated across all copies present in the system.

While this disclosure may utilize terminology drawn from a ML context, a person of skill in the art will readily understand that the disclosed systems and methods may be applied outside of the ML context and to any system managing object storage in relation to a decentralized network.

In the disclosed embodiments, the distributed ledger may be referred to as the blockchain, indicating that the disclosed distributed ledger is conceptualized as being effectuated by a blockchain network. However, other distributed ledgers are possible. The blockchain aspect allows for decentralized control and scalability, while also providing the requisite fault-tolerance to enable examples to work beyond the single entity/resource domain context. Moreover, due to the ability of blockchains to log every transaction, and because transactions are the only mechanism by which to change some global state, a durable audit log is achieved. Such an audit log can be used to build and auditing and compliance framework for workflow execution.

A command and control "view" or framework can be provided that allows participant nodes in a network to interact with each other using blockchain technology, where the view is globally consistent (vis-à-vis the blockchain), and reliable actions can be taken as result. The use of blockchain technology for federating workflows across resource domains may be implemented to ensure that the interactions, in this case, the storing/publishing of object metadata, is secured, non-repudiated, sequenced and permissioned.

In some embodiments, operations may be implemented to provide provenance tracking across a heterogeneous distributed storage platform to track which nodes conducted which operations. In some applications, metadata operations may be routed via a blockchain and storage devices or other network entities can be configured to accept operations only via the blockchain interface. For example, storage devices on the network can be commanded to allow metadata operations only via the blockchain interface. In this way, factors such as identity, authorization, provenance, non-repudiation and security can be provided for operations on nodes managed in this way.

Each of the nodes may act as a node that stores a complete or at least updated copy of the blockchain. A node may read its local copy of the blockchain to obtain the change requests. Upon receipt of a change request, the node may implement the change request and update its state to indicate the change request has been implemented. This state transition may be broadcast to other nodes, such as in the form of a blockchain transaction. Finally, although examples are described in the blockchain context, any distributed database or ledger that allows nodes to share object metadata may be used.

FIG. 1 illustrates an embodiment of a system 100 supporting decentralized policy-based transactional object management in the context of federated ML workflows. System 100 may be organized as a blockchain network, wherein a plurality of nodes 10A-10G are connected to one another using one or more connection protocols, including a peer-to-peer connection protocol. The particular number of, configuration of, and connections between the nodes 10A-G may vary. As such, the arrangement of nodes 10A-G shown in FIG. 1 is for illustrative purposes only. Node 10A is shown in detail to illustrate one embodiment of a node that allows for decentralized policy-based transactional object management for federated workflows running across system 100. In order to implement the disclosed decentralized policy-based transactional object management for federated workflows, at least one node must include one or more replicator components disclosed below capable of completing the methods disclosed in FIGS. 3-6 below. Further, in embodiments where other components are capable of completing the same disclosed methods, such components may take the place of the replicator component resulting in an effective embodiment. Further, not all nodes must include the disclosed replicator component in order for system 100 to support decentralized policy-based transactional object management.

Node 10A of system 100 may be a fixed or mobile device. While only one of the nodes 10A-G is illustrated in detail in the figures, any of the nodes 10A-G on system 100 may be configured in the manner illustrated. Nodes 10A-G may communicate with one another in a peer-to-peer manner. Node 10A is depicted including one or more comms interface(s) 30, user input/display device(s) 40, processor(s) 50, and machine readable media 60, all connected by interconnection system 20.

Machine readable media 60 may comprise a combination of different storage media with physical and/or logical separation. In addition, data and/or instructions stored on machine readable media 60 may be stored partially across a plurality of storage media. For instance, while executing blockchain agent 71, processor 50 may write some portion of blockchain/distributed ledger 81 from ROM to RAM, such that processor 50 will be able to more quickly access that portion of machine readable media 60 while executing remaining instructions within blockchain agent 71. This writing of some portion of blockchain/distributed ledger 81 from ROM to RAM does not remove some portion of blockchain/distributed ledger 81 from machine readable media 60, because machine readable media 60 may refer collectively to any and all forms of machine readable media accessible by the processor 50 (e.g., RAM, ROM, flash drives, processor caches, cloud storage).

Interconnection system 20 may refer to one or more communication media facilitating interaction between components of system 100. In FIG. 1, interconnection system 20 is structured as a bus connected to machine readable media 60, processor(s) 50, user input/display device(s) 40, and comms interface 30, however in some embodiments, one or more of these components may have dedicated connections to one or more of the other components. In some embodiments, one or more of these components may be connected to one or more of the other components via a network connection.

Processor(s) 50 may refer to one or more general purpose processors (e.g. microprocessors) and/or one or more special purpose processors (e.g., GPUs, network processors, or ASICs). Further, in embodiments where multiple processors are represented by processor(s) 50, said processors may be operated in parallel so that multiple instruction sets may be simultaneously executed by processor(s) 50.

User input/display device(s) 40 may refer to any device with which a user may interact (e.g. a keyboard, mouse, touch screen), which converts such interactions into signals interpretable by processor 50, and/or any device which may output a signal interpretable by a user (e.g. a smartphone screen, a liquid crystal display ("LCD"), a speaker).

Comms interface(s) 30 may refer to one or more devices that allow processor(s) 50 to communicate with components not located locally with processor(s) 50. Comms interface(s)

30 may also allow for instructions and/or data to be sent from machine readable media 60 over a network to other machines, such as other nodes on system 100. Comms interface(s) 30 may include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Instructions and data transferred via comms interface(s) 30 might typically be carried on signals, which can be electronic, electromagnetic (which includes optical) or other signals capable of being exchanged by a given comms interface(s) 30. These signals might be emitted from comms interface(s) 30 via a channel using a wired or wireless communication medium. Some examples of a channel might include a phone line, a cellular link, an RF link, an optical link, a network interface, a local or wide area network, and other wired or wireless communications channels.

Referring now to program instructions 70 and program data 80 present on machine readable media 60. Processor(s) 50 may execute instructions associated with blockchain agent 71, a configuration manager 72, a blockchain interface layer 73, an API layer 74, a replicator 75, an access plugin 76, a storage policy engine 77, and/or other instructions to perform various operations, each of which are described in greater detail below. These instructions may cause processor (s) 50 to read/and or write to the blockchain/distributed ledger 81, smart contract(s) 82, public key 83, private key 84, local policy 85, replicated object metadata 86, replicated object body 87, and/or other types of program data 80, each of which are described in greater detail below. As used herein, for convenience, the various program instructions 70 will be described as performing an operation, when in fact the instructions cause the processor(s) 50 to perform the operation when executed.

The disclosure herein describes the program instructions 70 and program data 80 of system 100 as they relate specifically to decentralized policy-based transactional object management for federated workflows. Disclosure regarding some of the components as they relate specifically to ML federated workflows can be obtained by reference to the '587 patent application referenced above. The embodiments disclosed herein are illustrated in relation to ML federated workflows, however the components specific to decentralized policy-based transactional object management may be applied to achieve similar results on systems employing workflows outside of the ML context.

Figure 2:
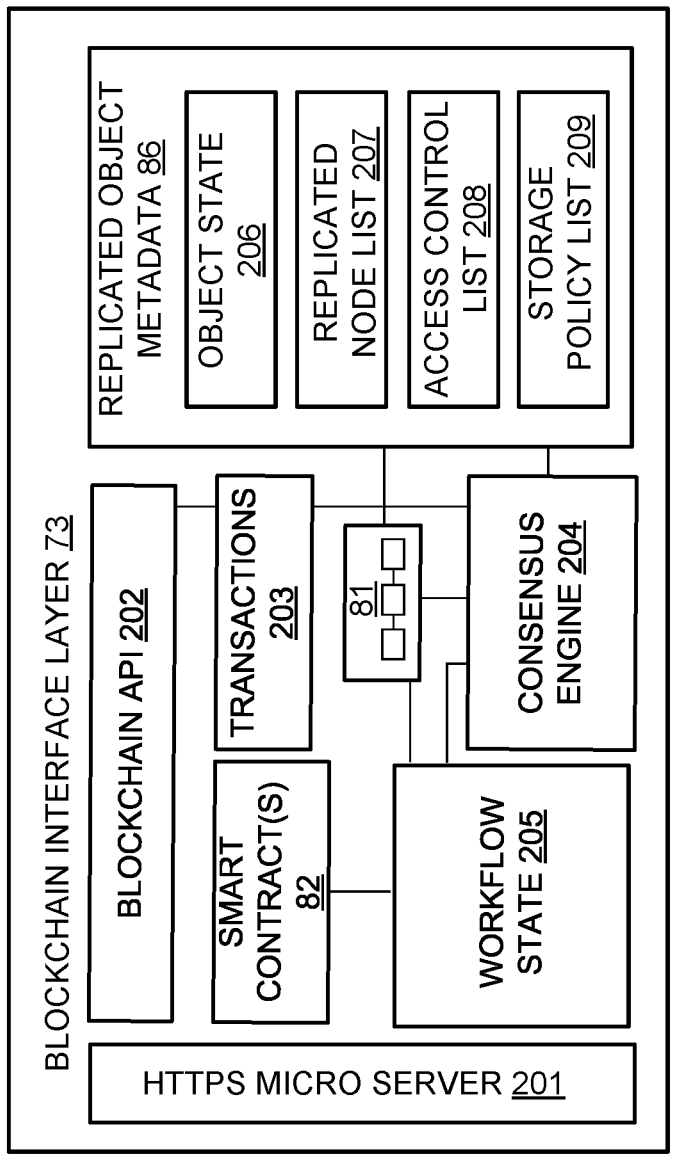
FIG. 2 illustrates an embodiment of a blockchain interface layer as implemented within a system supporting decentralized policy-based transactional object management in the context of federated ML workflows, according to the present disclosure.

As described in further detail in FIG. 2, the blockchain agent 71 and/or replicator 75 may use the blockchain interface layer 73 to communicate with other nodes 10B-G. The blockchain interface layer 73 may communicate with the blockchain network. For example, the blockchain agent 71 may obtain an updated copy of blockchain/distributed ledger 81 from one or more other nodes 10A-B.

The configuration manager 72 may obtain state information regarding the progress of a ML workflow task, e.g., that model training of a ML model is complete from the blockchain agent 71. The configuration manager 72 may, in accordance with an agent, progress with performing a required subsequent ML workflow task by node 10A. In some instances, the configuration manager 72 may perform an operation without a determination of whether to do so. In other instances, the configuration manager 72 may consult one or more local policies to ensure that node 10A can comply with the one or more ML workflow operations. The local policies may be encoded by the smart contracts 82.

Alternatively or additionally, some local policies may be stored in a local policy 85, which is not necessarily shared with other nodes 10B-G. In other words local policy 85 may be defined specifically at a node at which it is stored.

Blockchain agent 71 may broadcast its ML workflow state to other nodes of the blockchain network. For example, the blockchain agent 71 may generate and transmit a blockchain transaction that indicates the ML workflow state of node 10A (such as whether, a particular ML workflow task has been completed). The blockchain transaction may include information identifying whether the ML workflow task was (or was not) performed. For example, the information identifying the operation may be a block identifier (such as a block hash) that identifies the block from which the management operations was obtained. In this manner, the blockchain transaction indicating a node's ML workflow state may record the management operation that was (or was not) applied.

In the context of various examples, global state of a workflow is present as a local copy in each node of system 100. Any of the nodes of may initiate an operation to change the global workflow state, and once changed, the remaining/other nodes will obtain/become aware of that global workflow state change once that change of global workflow state request is recorded in the distributed ledger 81, i.e., a block approved by the blockchain network. Once such a block containing the global workflow state change transaction is received by a node, that node will update its copy of the distributed ledger 81 commensurate with the change. Once all the nodes have updated their respective copies of distributed ledger 81, the global workflow state change may be considered to have been effectuated.

As discussed above, where objects need to be stored on the system 100, additional components may be introduced to the federated workflows disclosed herein which allow for decentralized policy-based transactional object management. In the disclosed embodiment, API Layer 74, replicator 75, access plugin 76, and storage policy engine 74 are examples of program instructions 70 that allow for decentralized policy-based transactional object management on system 100 when implemented at one or more nodes.

API Layer 74 allows users and other nodes 10B-G on system 100 to interact with node 10A to store content on the system 100 in a decentralized, policy-based, and transactional manner. API Layer 74 may comprise any type of application programming interface (e.g. representational state transfer "REST", simple object access protocol "SOAP", remote procedure call "RPC") which allows users and/or other nodes 10B-G to communicate objects to node 10A, allows users and/or other nodes 10B-G to request objects stored on node 10A, allows users and/or other nodes 10B-G to request information regarding objects stored on any node of system 100, and/or allows users and/or other nodes 10B-G to change object metadata associated with objects stored on any node of system 100. In some embodiments, users may communicate with node 10A via user input/display device(s), wherein such communications are then handled by API layer 74. In some embodiments other nodes 10B-G may communicate with node 10A via the above described peer-to-peer connections and/or comms interface(s) 30, wherein such communications are then handled by API layer 74. In some embodiments, users may communicate with node 10A via communications with other nodes 10B-G, which are then relayed to node 10A via the above described peer-to-peer connections and/or comms interface(s) 30.

Replicator 75 allows for decentralized policy-based object management functions by providing object registration (discussed further in relation to FIG. 3), object replication (discussed further in relation to FIG. 4), object metadata access (discussed further in relation to FIG. 5), and object metadata manipulation (discussed further in relation to FIG. 6) functions. When a new object is received at node 10A's API layer 74, node 10A's replicator 75 registers the object into the system 100 by generating metadata associated with the object and storing the object body on node 10A's replicated object body storage 87. The object metadata is copied to the blockchain/distributed ledger 81 signaling to other nodes 10B-G that a new object has been registered on the system 100. In some embodiments, analogous replicators at other nodes 10B-G may then request the object body for storage at one or more other nodes, allowing for replication of the object at multiple nodes of system 100, creating multiple replicating nodes. Replicators present at one or more nodes on system 100 may also grant requests for access to object body and/or metadata such that the requestor may manipulate policies governing the storage of the object on system 100. The ability of a requestor to manipulate and/or receive objects from multiple nodes on system 100 allows for decentralized object management. In addition, where objects stored at a replicating node are tasks discussed above and in the federated ML workflows context detailed in the '587 patent application referenced above, policies associated with how the object/tasks are to be handled by the federated ML workflows can be implemented in the object metadata. The ability of the objects to be handled by such policies in their associated metadata allows for policy-based transactional object management.

Access plugin 76 facilitates storage of objects in heterogeneous storage formats at nodes of system 100 without sacrificing decentralized aspects of the present disclosure. In embodiments where replicated object body storage 87 at node 10A consists of a storage type that differs from storage formats on one or more nodes 10B-G, (i.e. replicated object body storage 87 is saved on to a portion of machine readable media 60 using NTFS format, while other nodes 10B-G store their objects on a portion of machine readable media using FAT32 format), then access plugin 76 interfaces object reading and writing to/from replicated object body storage 87. Including access plugin 76 ensures that, where an object stored at replicated object body storage 87 needs to be translated into another format before replicator 75 may send the object body to another user or node 10B-G via API layer 74, the object is translated into the appropriate format before being sent. This allows for replication of objects at multiple nodes on system 100, such that a user may access objects in a decentralized manner because users may receive or register an object at multiple nodes, rather than only at the nodes that may have storage compatible with the current format of the object body.

Storage policy engine 77 operates on inputs derived from an object's metadata generated by replicator 75. Storage policy engine 77 takes these inputs and outputs actions that are to be taken with regard to the associated object. In some embodiments, storage policy engine 77 is a component of replicator 75. In other embodiments, storage policy engine 77 is its own separate component within node 10A.

In some embodiments, storage policy engine 77 recognizes cost-dependent object storage schemes. Cost-dependent object storage schemes may be implemented by storing frequently used objects on enterprise grade storage available at one or more nodes, while storing one-time use objects on slower or less-expensive storage available at one or more nodes.

In some embodiments, storage policy engine 77 recognizes region-dependent object storage schemes. Region-dependent object storage schemes may be implemented by restricting object body data to particular geographic or organizational boundaries. This is implemented by only permitting nodes located within the particular geographic or organizational boundaries to act as replicating nodes.

In some embodiments, storage policy engine 77 recognizes time-dependent object storage schemes. Time-dependent object storage schemes may be implemented by setting and expiration date for an object, wherein replicating nodes are required to delete the object body data from their local object body storage after the expiration date has passed.

In some embodiments, storage policy engine 77 recognizes availability-dependent object storage schemes, wherein objects have a set number of replicating nodes that the network should contain. This may be implemented by requiring one or more nodes to replicate the object body to their local object body storage until the number of replicating nodes meets the desired number of replicating nodes in the policy. Alternatively, one or more replicating nodes may be required to delete object body data at their local object body storage where the number of replicating nodes exceeds a limit on replicating nodes specified in the policy.

In some embodiments, storage policy engine 77 recognizes identity group-dependent object storage schemes, wherein objects may only be accessed by users or nodes with specified credentials. This may be implemented by a node's replicator checking the credentials of users or nodes requesting to access and/or manipulate objects stored on system 100. Where the requestor's credentials do not match credentials listed under an approved identity group, access to the object metadata is denied by the replicator. Alternatively where the requestor's credentials do match credentials listed under a denied identity group, access to the object metadata is denied by the replicator.

In some embodiments, storage policy engine 77 recognizes storage quota schemes, wherein objects associated with system 100 may only occupy a limited amount of storage on a node's machine readable media. This may be implemented by a replicating node's replicator removing objects stored at the replicating node's local object body storage when the amount of machine readable media allocated to objects associated with system 100 exceeds a predefined limit. In some embodiments, the replicating node's replicator may first send a copy of the object to a different node before deleting the object stored at the node's local object body storage, such that the number of replicating nodes for the object remains fixed. This storage quota scheme will help preserve autonomy on a node, as node is able to prevent itself from being overloaded with objects associated with system 100.

Node 10A may store on machine readable media 60 a copy of the distributed ledger 81, the node's copy of smart contracts 82, public keys 83, private keys 84, the nodes local policies 85, replicated object metadata 86, replicated object body storage 87, and/or other data.

The smart contracts 82 may include rules that configure nodes to behave in certain ways in relation to federated ML workflow orchestration. For example, the rules may specify deterministic state transitions, which nodes may undergo while performing tasks of a federated ML workflow, or other actions that a node may take for federated ML workflow orchestration.

The node 10A may store public encryption keys 83 and/or private encryption keys 84 of nodes 10A-G in association with their identities (such as Internet Protocol or other addresses and/or identifying information). In this manner, in some implementations, change requests may be targeted to specific nodes and encrypted using a target node's public key.

As discussed above in relation to replicator 75, and as discussed below in relation to FIGS. 3-6, a node employing decentralized policy-based transactional object management will generate and/or manipulate metadata for an object registered to the system 100. This replicated object metadata 86 will be stored at least temporarily at the node 10A such that replicator 75 may utilize the object metadata in carrying out its various functions described herein. In many embodiments, the copy object metadata stored at replicated object metadata 86 is manipulated d and then written to the blockchain/distributed ledger 81 in via the blockchain interface layer 73. As discussed below, writing changed or manipulated object metadata to the blockchain/distributed ledger 81 will then signal to all nodes on system 100 that an object has been registered to system 100 and/or manipulated.

As discussed above regarding the access plugin 76, where the object is stored at the node 10A, it is written to replicated object body storage 87. In some embodiments, an access plugin 76 is required to allow for objects to be stored in heterogeneous storage formats across different nodes of system 100. In other embodiments, an access plugin 76 is not required as the replicated object body storage 87 is in a format that is homogenous with one or more nodes on the system 100.

FIG. 2 illustrates an embodiment of a blockchain interface layer 73 as implemented within a system 100 supporting decentralized policy-based transactional object management in the context of federated ML workflows. Each of the nodes 10 may implement the blockchain interface layer 73. The blockchain interface layer 73 may include a messaging interface used to communicate with the blockchain network. The messaging interface may be configured as a Secure Hypertext Transmission Protocol ("HTTPS") microserver 201. Other types of messaging interfaces may be used as well. The blockchain interface layer 73 may use a blockchain API 202 to make calls for blockchain functions based on a blockchain specification. Examples of blockchain functions include, but are not limited to, reading and writing blockchain transactions 203 and reading and writing blockchain blocks to blockchain 81. One example of a blockchain specification is the Ethereum specification. Other blockchain specifications may be used as well. Consensus engine 204 may include functions that make consensus decisions, such as whether to enroll a node to participate in a federated ML workflow. The workflow state of a node can be reflected by workflow state 205.

In some embodiments employing decentralized policy-based transactional object management, the replicator 75 utilizes the blockchain interface layer 73 to write replicated object metadata 86 to the blockchain/distributed ledger 81. In some embodiments, in order to read the version of an object metadata as recognized globally across system 100, replicator 75 writes the object metadata from the blockchain/distributed ledger 81 to replicated object metadata 86. The replicated object metadata 86 then may be manipulated by replicator 75 and written back to the blockchain/distributed ledger 81 in order to push changes to the object metadata across system 100.

In some embodiments, the replicated object metadata 86 includes object state 206, wherein the object state 206 includes a unique object ID, a cryptographic hash, and various attributes of the object, such as the size of the object and/or the file format of the object. In some embodiments, the replicated object metadata 86 includes a replicated node list 207. The replicated node list 207 lists information regarding each node 10 (e.g., a node unique identifier, a URL location of the node, the type of storage available at the node) where the object is stored on that nodes replicated object body storage 87. In some embodiments, the replicated object metadata 86 includes an access control list 208, wherein the access control list 208 lists criteria for identifying which nodes or users may request and/or manipulate the associated object. In some embodiments, the replicated object metadata 86 includes a storage policy list 209, wherein the storage policy list 209 includes policies governing the storage of the associated object. Such policies may include any policy discussed above in relation to storage policy engine 77, and/or any governance feature relating to the associated object, and/or any ML workflow based policy as discussed above and detailed in the '587 patent application referenced above.

In some embodiments, members of replicated object metadata (e.g. object state 206, replicated node list 207, access control list 208, storage policy list 209) themselves may exceed size limitations inherent in the distributed ledger. In such cases, the members may themselves be converted into replicated objects by creating metadata referencing the member and storing the member data itself at a replicating node as object body data. For instance, where an access control list associated with a first replicated object becomes too large to store on the distributed ledger as metadata for the first replicated object, the access control list itself may be moved off-ledger onto a replicated object body storage at a replicating node, and a second replicated object metadata generated for the access control list. Where the access control list is later referred to in a query of the metadata for the first replicated object, the second replicated object metadata will be referenced in order to request the access control list from a replicating node.

In some embodiments, the storage policy list 209 may be extended dynamically by adding new features to the object via smart contracts enforcing those new policies. For instance, a smart contract indicating which nodes should replicate the associated object may be appended to the storage policy list 209 of the replicated object metadata 86. When this version of the replicated object metadata 86 is written to the blockchain/distributed ledger 81 by one or more replicator 75 at one node 10, the other nodes on the blockchain network will see this added policy and replicators at the nodes indicated to replicate the associated object will begin the process (discussed further in FIG. 4 below) of requesting the object from a node containing the object in its replicated object body storage.

Although illustrated in FIG. 1 as a single component, node 10A may include a plurality of individual components (such as computer devices) each programmed with at least some of the functions described herein. The one or more processor(s) 50 may each include one or more physical processors that are programmed by computer program instructions. The various instructions described herein are provided for illustrative purposes. Other configurations and numbers of instructions may be used, so long as the processor(s) 50 are programmed to perform the functions described herein.

Furthermore, it should be appreciated that although the various functions are illustrated in FIG. 1-2 as being co-located within a single processing unit, in implementations in which processor(s) 50 includes multiple processing units, one or more instructions may be executed remotely from the other instructions.

The various instructions for performing functions described herein may be stored in a machine readable media 60, which may comprise random access memory RAM, ROM, and/or other memory. Machine readable media 60 may comprise one or more non-transitory machine-readable storage media such as floppy disks, hard disks, optical disks, tapes, or other physical storage media for storing computer-executable instructions and/or data.

The blockchain/distributed ledger 81, transaction queue, smart contracts 82, operations to be performed, and/or other information described herein may be stored in various storage devices such as machine readable media 60. Other storage may be used as well, depending on the particular storage and retrieval requirements. For example, the various information described herein may be stored using one or more databases, locally. In some examples, these database instances need not be shared. Use of distributed ledger 81 as a common resource/repository for the entire federated framework is sufficient in some embodiments. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The nodes 10A-G referenced above may be coupled to other nodes via a network, which may include any one or more of, for instance, the Internet, an intranet, a PAN (Personal Area Network), a LAN (Local Area Network), a WAN (Wide Area Network), a SAN (Storage Area Network), a VPN (Virtual Private Network), a MAN (Metropolitan Area Network), a wireless network, a cellular communications network, a Public Switched Telephone Network, and/or other network. Furthermore, according to various implementations, the components described herein may be implemented in hardware and/or software that configure hardware.

Figure 3:
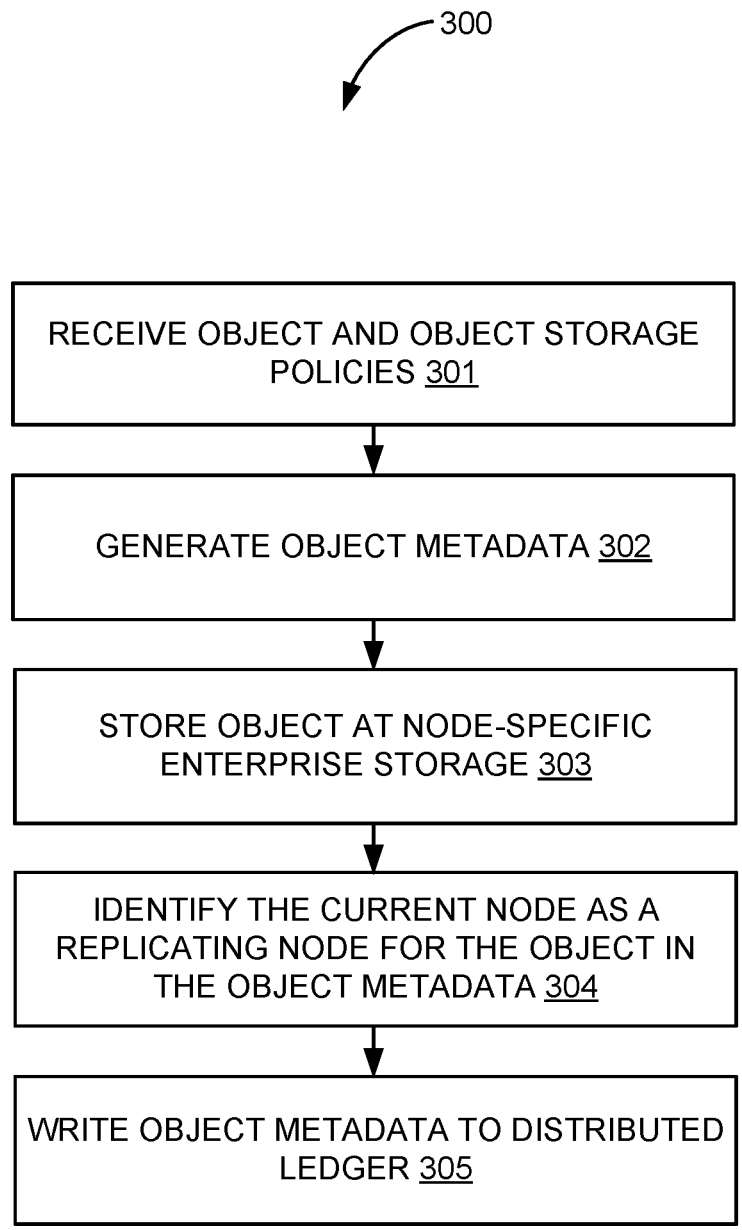
FIG. 3 illustrates a method for registering a new object into a system supporting decentralized policy-based transactional object management in the context of federated ML workflows, according to the present disclosure.

FIG. 3 illustrates a method 300 for registering a new object into a system supporting decentralized policy-based transactional object management in the context of federated ML workflows. Method 300 is discussed with reference to node 10A components discussed in FIGS. 1-2. In some embodiments the disclosed steps are conceptualized as being taken by replicator 75 within node 10A. However, as discussed above, where a component set of instructions such as replicator 75 is described as taking steps, one may conceptualize that instructions associated with replicator 75 are being executed by processor(s) 50, causing the processor(s) 50 take the disclosed steps. In addition, in other embodiments, other program instructions 70 may be conceptualized as taking the steps disclosed herein without substantially affecting the function of the disclosed system 100, as long as the steps are taken by some component of node 10A, in any order achieving the disclosed purpose of registering a new object into system 100.

At step 301, node 10A receives an object for storage on system 100. In some embodiments, this is effectuated by replicator 75 monitoring API layer 74 until an object is received. The object may be accompanied by policies governing the storage of the object, wherein such storage policies may be reflected in object metadata accompanying the object, or as their own policies associated with the object.

After detecting the object received at the API layer 74, replicator then completes step 302, wherein object metadata is generated which is associated with the object. As discussed in FIG. 2 regarding replicated object metadata 86, the object metadata may include object state 206, replicated node list 207, access control list 208, storage policy list 209, or any other data relevant to how the associated object should be stored across system 100.

After generating the replicated object metadata 86, replicator 75 completes step 303 by storing the object body at node-specific enterprise storage. In some embodiments, this is accomplished by passing the object body through access plugin 76 at replicator 75's associated node 10A, wherein the access plugin 76 then converts the object body into a format appropriate for storage at node 10A's replicated object body storage 87. In some embodiments, such as those where all nodes on system 100 have homogenous replicated object body storage characteristics, step 303 may be accomplished by replicator 75 simply writing the object body to replicated object body storage 87.

After writing the object body to node 10A's replicated object body storage 87, replicator 75 then completes step 304 by modifying the object metadata generated at step 302 to reflect that replicator 75's node 10A is a replicating node for the object. In some embodiments, modifying the object metadata includes adding replicator 75's node 10A to the replicated node list 207. In some embodiments, this step may be completed when the object metadata is first generated, on the understanding that the object body will be stored at the node. In some embodiments, the replicator 75 may instead pass the object body to another node via the API layer 74 and the peer-to-peer connection, such as where the node 10A is not designated as an intended replicating node in object storage policies received at step 301.

After updating the object metadata to reflect that node 10A is a replicating node, the replicator 75 completes step 305 by writing the object metadata to distributed ledger 81. In some embodiments, this is accomplished by following the same procedures described above in FIG. 2 for writing to blockchain/distributed ledger 81 via the blockchain interface layer 73. After writing node 10A's replicated object metadata 86 to the distributed ledger 81, replicators present at one or more other nodes on the system 100 may see that the object has been registered, and node 10A is a replicating node for the object.

Figure 4:
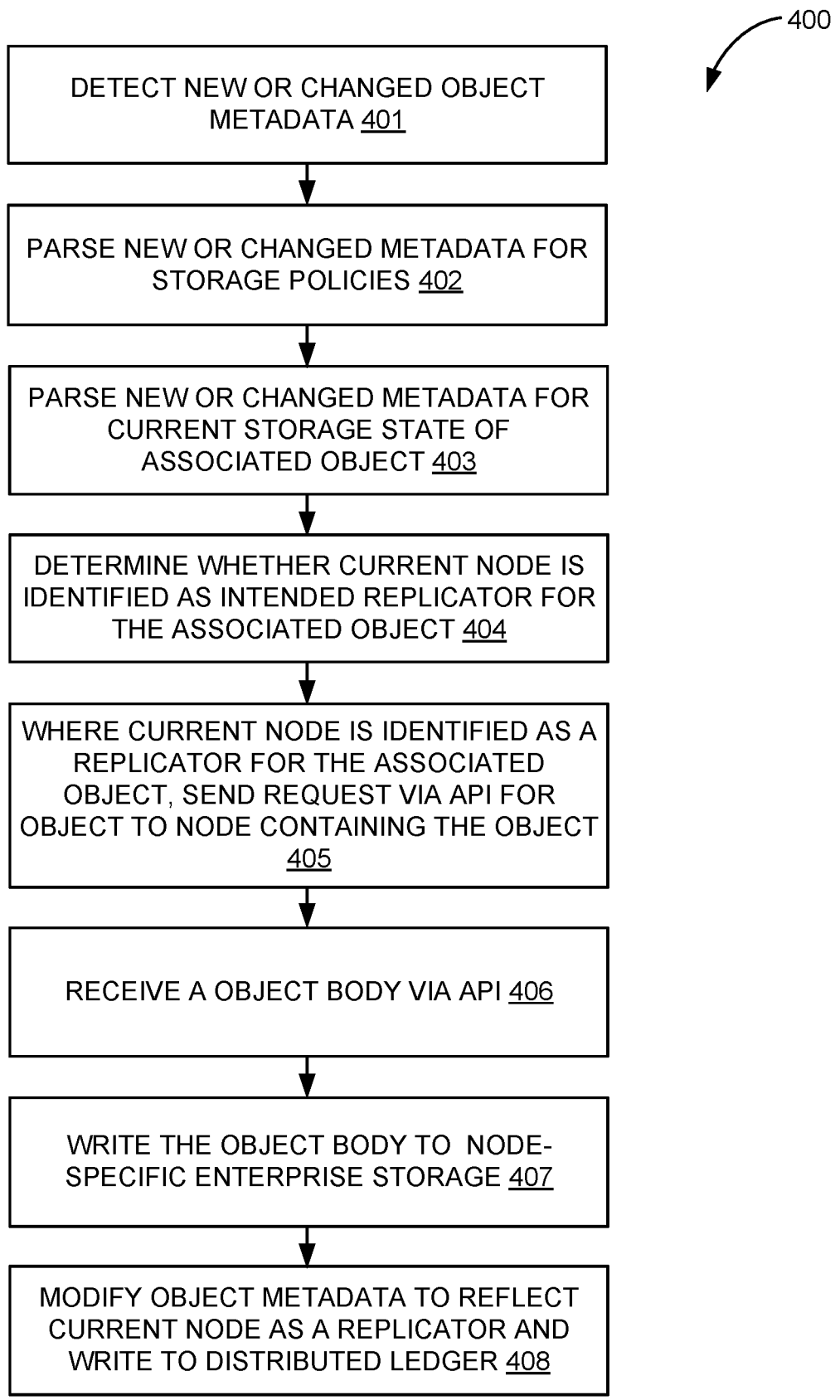
FIG. 4 illustrates a method for replicating an object from a first node to a second node on a system supporting decentralized policy-based transactional object management in the context of federated ML workflows, according to the present disclosure.

FIG. 4 illustrates a method 400 for replicating an object from a first node to a second node on a system 100 supporting decentralized policy-based transactional object management in the context of federated ML workflows. Method 400 is discussed with reference to node 10A components discussed in FIGS. 1-2. In some embodiments the disclosed steps are conceptualized as being taken by replicator 75 within node 10A. However, as discussed above, where a component set of instructions such as replicator 75 is described as taking steps, one may conceptualize that instructions associated with replicator 75 are being executed by processor(s) 50, causing the processor(s) 50 take the disclosed steps. In addition, in other embodiments, other program instructions 70 may be conceptualized as taking the steps disclosed herein without substantially affecting the function of the disclosed system 100, as long as the steps are taken by some component of node 10A, in any order achieving the disclosed purpose of replicating an object from a first node to a second node on system 100.

At step 401, replicator 75 detects new or changed object metadata present in the distributed ledger 401. In some embodiments, this is accomplished by replicator 75 repeatedly following the same procedures described above in FIG. 2 for reading from the blockchain/distributed ledger 81 via the blockchain interface layer 73. This repeated reading from the blockchain/distributed ledger 81 allows replicator 75 to continually monitor for new or changed object metadata. New object metadata indicates that a new object has been registered into system 100 per procedures as described in relation to method 300 described in FIG. 3 above. Changed object metadata indicates that policies or attributes of an object stored at one or more nodes of system 100 have changed.

After detecting new or changed metadata, replicator 75 completes step 402 by parsing the new or changed metadata for storage policies 402. In some embodiments this is completed by comparing the new or changed metadata against storage policy engine 77, which is stored locally at replicator 75's node and includes definitions for various policies that are shared across the system 100.

Replicator 75 next moves to step 403, wherein replicator 75 parses the new or changed metadata for the current storage state of the associated object. In some embodiments, this is completed by querying the object state 206 and/or replicated node list 207 portion of the replicated object metadata 86 to determine which nodes have a replica of the object stored at the replicated object body storage.

Replicator 75 next undertakes step 404, wherein replicator 75 determines whether the replicator 75's node 10A is identified as an intended replicator node for the associated object. In some embodiments, this is completed by querying the storage policy list 209 to determine if any object storage policies associated with the object dictate that the object should be replicated to node 10A.

Where replicator 75 detects that node 10A is identified as a replicating node for the associated object, replicator 75 sends a request for the object body via API layer 74 to one or more replicating nodes for the object. In some embodiments, the request is sent over a peer-to-peer network to the other nodes by node 10A's API layer 74. In some embodiments, the node(s) receiving the request are identified by replicator 75 referring to the nodes listed in the replicated node list 207 queried at step 403.

Assuming that node 10A has appropriate access privileges to request a copy of the object (discussed further below in relation to FIG. 5), at step 406 replicator 75 receives a copy of the object via API layer 74. In some embodiments, the object body is sent by one or more other nodes over a peer-to-peer network to node 10A's API layer 74.

After receiving the replicated object body, replicator 75 completes step 407 by storing the object body at node-specific enterprise storage. In some embodiments, this is accomplished by passing the object body through access plugin 76 at node 10A, wherein the access plugin 76 then converts the object body into a format appropriate for storage at node 10A's replicated object body storage 87. In some embodiments, such as those where all nodes on system 100 have homogenous replicated object body storage characteristics, step 407 may be accomplished by replicator 75 simply writing the object body to replicated object body storage 87.

After writing the object body to node 10A's replicated object body storage 87, replicator 75 then completes step 408 by modifying the replicated object metadata 86 to list node 10A as a replicating node, and then writing the replicated object metadata 86 to distributed ledger 81. In some embodiments, modifying the object metadata includes adding node 10A in the replicated node list 207. In some embodiments, writing the object to the distributed ledger 81 is accomplished by following the same procedures described above in FIG. 2 for writing to blockchain/distributed ledger 81 via the blockchain interface layer 73. After writing node 10A's replicated object metadata 86 to the distributed ledger 81, replicators present at one or more other nodes on the system 100 may see that node 10A is now a replicating node for the object.

Figure 5:
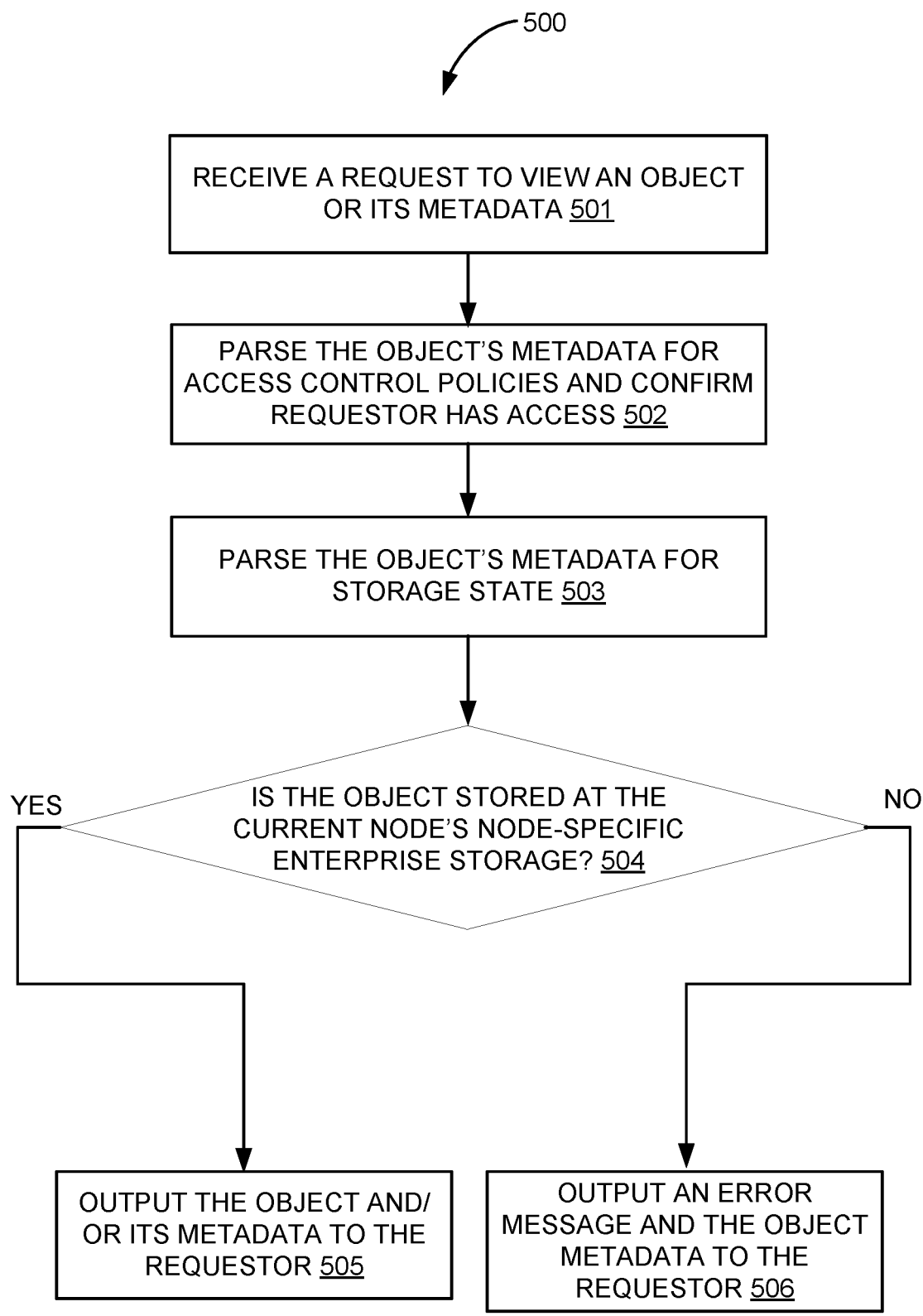
FIG. 5 illustrates a method for handling requests for object body data or object metadata received by a node on a system supporting decentralized policy-based transactional object management in the context of federated ML workflows, according to the present disclosure.

FIG. 5 illustrates a method 500 for handling requests for object body data or object metadata received by a node on a system 100 supporting decentralized policy-based transactional object management in the context of federated ML workflows. Method 500 is discussed with reference to node 10A components discussed in FIGS. 1-2. In some embodiments the disclosed steps are conceptualized as being taken by replicator 75 within node 10A. However, as discussed above, where a component set of instructions such as replicator 75 is described as taking steps, one may conceptualize that instructions associated with replicator 75 are being executed by processor(s) 50, causing the processor(s) 50 take the disclosed steps. In addition, in other embodiments, other program instructions 70 may be conceptualized as taking the steps disclosed herein without substantially affecting the function of the disclosed system 100, as long as the steps are taken by some component of node 10A, in any order achieving the disclosed purpose of handling requests for object body data or object metadata received by node 10A on a system 100.

At step 501, node 10A receives a request for an object's body or metadata. In some embodiments, this request is received from a user interacting with user input/display device(s) 40 to present the request via API layer 74. In some embodiments, this request is received from a user interacting with the user interface for working with federated ML workflows disclosed in the '587 patent application referenced above. In some embodiments, this request is received from another node via a peer-to-peer network. In some embodiments, this request is detected by node 10A's replicator 75 continually monitoring API layer 74.

After replicator 75 detects the request at API layer 75, replicator 75 undertakes step 502 by parsing the associated object's metadata for access control policies. This is done to confirm whether the requesting entity (e.g., a user, another node on system 100) has the appropriate privileges to receive the object's metadata and/or body. In some embodiments, step 502 is completed by replicator 75 querying the access control list 208 present in the object metadata present on blockchain/distributed ledger 81. The object metadata can be queried by replicator 75 using the blockchain interface layer 73 via the procedures described above in relation to FIG. 2 to copy the object metadata from the blockchain/distributed ledger 81 to replicated object metadata 86.

Where the requestor has access to the metadata, replicator 75 next completes step 503 by parsing the object's metadata for the current storage state of the object. In some embodiments, where the requestor does not have access to the metadata, replicator 75 simply halts completion of method

500. In some embodiments, where the requestor does not have access to the metadata, replicator 75 outputs an error message via API layer 74 indicating that access to the object body and/or metadata has been denied to the requestor. In some embodiments, parsing of the object's metadata for the current storage state of the object is done by replicator 75 querying the replicated object metadata 86 for object state 206 and/or replicated node list 207. In some embodiments, the replicated object metadata 86 may be queried by replicator 75 using the blockchain interface layer 73 via the procedures described above in relation to FIG. 2.

Replicator 75 next moves on to step 504 where replicator 75 determines if the object is stored at node 10A's replicated object body storage 87. In some embodiments this is determined by looking to see if a unique identifier associated with node 10A is found in either the replicated node list 207 or in the object state 206 queried in step 503.

Where the object is stored at node 10's replicated object body storage 87, replicator 75 completes step 505 by outputting the object body and/or its metadata to the requestor. In some embodiments, this outputting is done by replicator 75 retrieving the object body from replicated object body storage 87 via access plugin 76, and then replicator 75 passing the object body to API layer 74 to be output to the requestor. In some embodiments, such as where the object body storage 87 is homogenous across one or more nodes on system 100, this outputting may be done by replicator 75 directly retrieving the object body from replicated object body storage 87.

Where the object is not stored at node 10's replicated object body storage 87, replicator 75 completes step 506 by outputting an error message and/or the object metadata to the requestor 506. In some embodiments, this is done by replicator 75 generating an error message and outputting it to the requestor via API layer 74, wherein the error message explains that the object body is not stored at node 10A and includes the object metadata in the error message. In some embodiments, the message may be displayed to the requestor via a user input/display device(s) 40. In some embodiments, the message may be displayed to the requestor with the user interface for working with federated ML workflows disclosed in the '587 patent application referenced above. In some embodiments, where the object metadata is included with the error message, the requestor may parse the object metadata to determine which nodes on system 100 are replicating node, and the requestor may then direct a new request to one or more replicating nodes.

Figure 6:
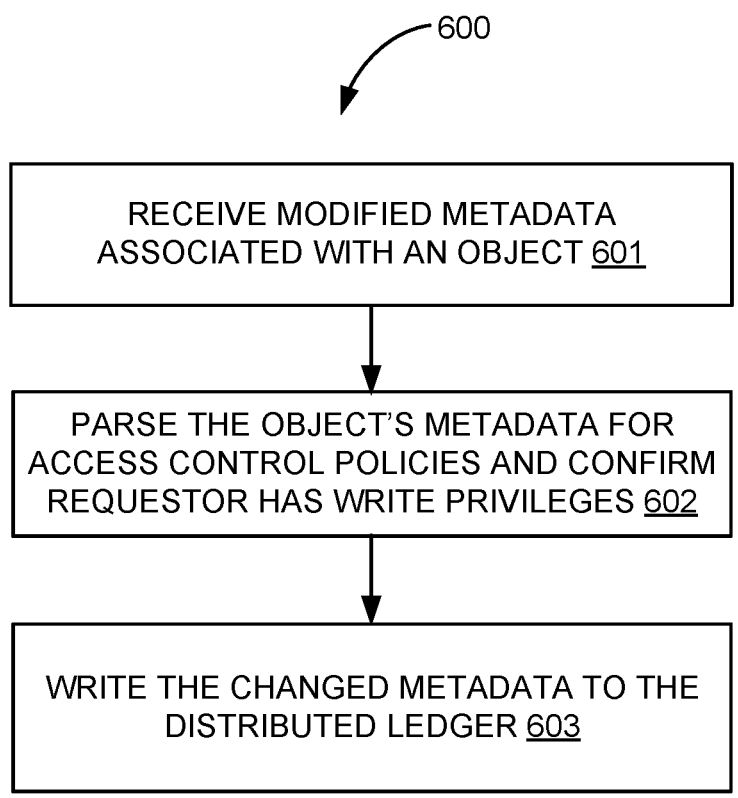
FIG. 6 illustrates a method for handling requests to modify object metadata received by a node on a system supporting decentralized policy-based transactional object management in the context of federated ML workflows, according to the present disclosure.

FIG. 6 illustrates a method for handling requests to modify object metadata received by a node on a system 100 supporting decentralized policy-based transactional object management in the context of federated ML workflows. Method 600 is discussed with reference to node 10A components discussed in FIGS. 1-2. In some embodiments the disclosed steps are conceptualized as being taken by replicator 75 within node 10A. However, as discussed above, where a component set of instructions such as replicator 75 is described as taking steps, one may conceptualize that instructions associated with replicator 75 are being executed by processor(s) 50, causing the processor(s) 50 take the disclosed steps. In addition, in other embodiments, other program instructions 70 may be conceptualized as taking the steps disclosed herein without substantially affecting the function of the disclosed system 100, as long as the steps are taken by some component of node 10A, in any order achieving the disclosed purpose of handling a request to modify object metadata received by a node on a system 100.

At step 601, node 10A receives a request to modify metadata associated with an object stored at one or more nodes of system 100. In some embodiments, this is completed by replicator 75 repeatedly monitoring API layer 74 for the receipt of a request to modify metadata. In some embodiments, this request originates from a user interacting with user input/display device(s) 40. In some embodiments, this request originates from a user interacting with a user interface for working with federated ML workflows disclosed in the '587 patent application referenced above.

After receiving a request to modify metadata associated with an object, replicator 75 completes step 602 by parsing the object's metadata for access control policies and confirming whether the requestor has the appropriate privileges to modify the associated object's metadata. In some embodiments, step 602 is completed by replicator 75 querying the access control list 208 present in the object metadata. In some embodiments, the object metadata is first copied by replicator 75 from the blockchain/distributed ledger 81 to replicated object metadata 86 using the blockchain interface layer 73 via the procedures described above in relation to FIG. 2. In some embodiments, replicator 75 confirms whether the requestor has the appropriate privileges to modify the associated object's metadata by comparing a unique identifier associated with the requestor against the list of identifiers with write privileges present in the access control list 208 in replicated object metadata 86.

Where the requestor has write privileges regarding the object's metadata, replicator 75 next completes step 603 by writing the changes to the metadata per the requestor's request. In some embodiments, replicator 75 may write the changed metadata to the blockchain/distributed ledger 81 using the blockchain interface layer 73 via the procedures described above in relation to FIG. 2 to write the changed metadata to the replicated object metadata 86, and then in turn writing the replicated object metadata 86 to the blockchain distributed ledger 81. In some embodiments, where the requestor does not have write privileges regarding the object metadata, replicator 75 simply halts completion of method 600. In some embodiments, where the requestor does not have write privileges regarding the object metadata, replicator 75 outputs an error message via API layer 74 indicating that the requestor does not have adequate write privileges. In some embodiments, after the replicator 75 writes the changed object metadata to the blockchain/distributed ledger 81, one or more other nodes on system 100 react to the changed object metadata by enforcing the new policies which may now be present in the replicated object metadata 86's storage policy list 209.

Figure 7:
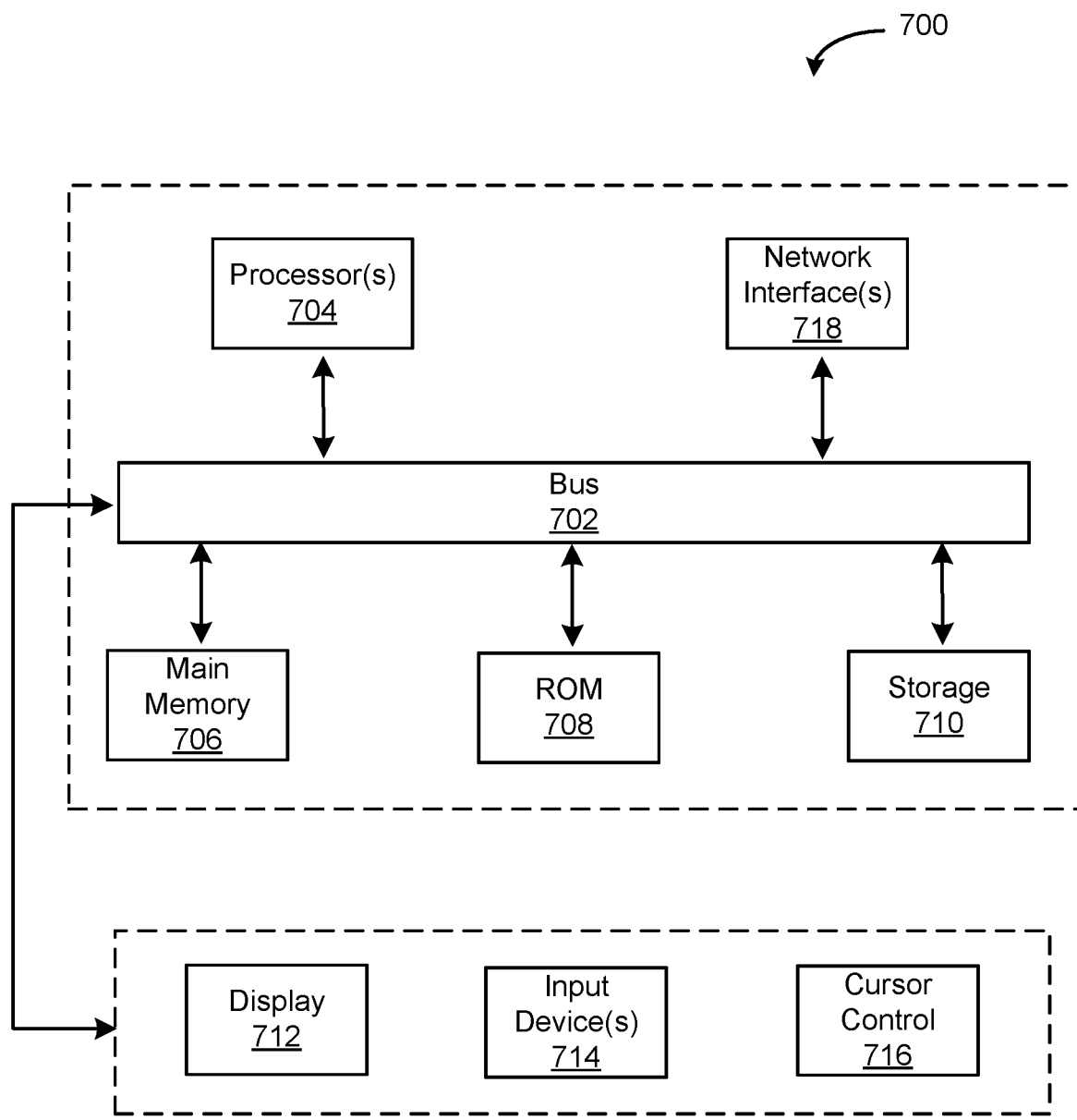
FIG. 7 depicts a block diagram of an example computer system in which various embodiments described herein may be implemented.

FIG. 7 depicts a block diagram of an example computer system 700 in which various embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. In some embodiments, computer system 700 may be an embodiment of any processors, controllers, and similar components described herein, e.g., processor(s) 50, or may be used to realize the functionality of various components.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicate with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, located at a first node on a decentralized network, implementing decentralized policy-based transactional object management, the system comprising:
    a processor; and
    a memory including instructions that, when executed, cause the processor to:
        check a distributed ledger for an object metadata associated with an object;
        parse the object metadata for a storage policy data and a storage state data;
        determine, based on the storage policy data and the storage state data, whether the object should be stored at the memory;
        identify a first replicating node from the storage state data;
        send a request for the object to the first replicating node;
        responsive to receiving the object, store the object at the memory;
        change the object metadata to indicate the first node as a second replicating node, wherein the indication of the first node as a replicating node on the distributed ledger is defined in a policy stored at a second node to mean that the first node may send a copy of the object to the second node in response to a request for the object sent by the second node; and
        write the object metadata to the distributed ledger.

2. The system of claim 1, further comprising:
    an API layer, wherein:
        the request for the object is sent to the first replicating node via the API layer; and
        the object is received by the processor from the first replicating node via the API layer.

3. The system of claim 1, further comprising a storage policy engine configured to interpret object storage schemes within the storage policy data.

4. The system of claim 3, wherein:
    the storage policy engine is configured to interpret availability-dependent object storage schemes; and
    availability-dependent object schemes comprise defining a limit on the number of replicating nodes for the object.

5. The system of claim 3, wherein:
    the storage policy engine is configured to interpret identity group-dependent object storage schemes; and
    the identity group-dependent object storage schemes comprise limiting read or write privileges for an object to members of one or more defined identity groups.

6. The system of claim 3, wherein:
    the storage policy engine is configured to interpret storage quota schemes; and
    the interpret storage quota schemes comprise allowing storage of the object only at nodes storing less than a defined amount of object body data.

7. A non-transitory computer readable medium storing instructions that when executed by a computer, cause the computer to:
    responsive to receiving, at a first node on a decentralized network, a request to view a first object metadata, parse the first object metadata for a policy governing read privileges with respect to an object, wherein:
        the object is stored at a second node indicated in a distributed ledger as a replicating node;
        the indication of the second node as a replicating node on the distributed ledger is defined in a policy stored at a third node to mean that the second node may send a copy of the object to the third node in response to a request for the object sent by the third node;
        the first object metadata is associated with the object; and
        the first object metadata comprises storage policy data and storage state data describing how the object is stored on the decentralized network;
    compare the requestor's attributes with the policy governing read privileges with respect to the object; and output the first object metadata from the first node to the requestor.

8. The non-transitory computer readable medium of claim 7, wherein when the instructions are executed by the computer, further cause the computer to:

responsive to receiving, at the first node, a second object metadata from the requestor, parse the first object metadata for a policy governing write privileges with respect to the object, wherein:
   the second object metadata is associated with the object; and
   the second object metadata differs from the first object metadata;
compare the requestor's attributes with the policy governing write privileges with respect to the object; and
write the second object metadata to the distributed ledger.

9. The non-transitory computer readable medium of claim 8, wherein:

the first object metadata contains an access control list, wherein the access control list contains the policy governing read privileges and the policy governing write privileges.

10. The non-transitory computer readable medium of claim 8, wherein:

the request to view the first object metadata was generated by an application providing a user interface at the first node to a user; and
the user interface assisted the user to provide credentials and structure the request in a machine readable format.

11. The non-transitory computer readable medium of claim 9, wherein:

the application presented a user interface to the user wherein the user interface provided the user with storage policy data and storage state data from the first object metadata;
the application generated the second object metadata based on input from the user.

* * * * *